United States Patent Office 3,488,415
Patented Jan. 6, 1970

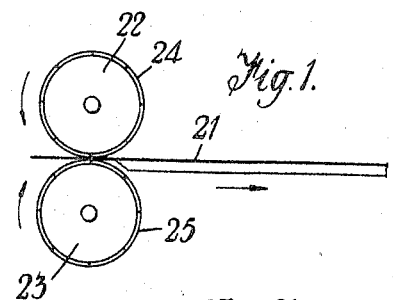
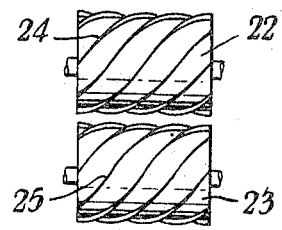
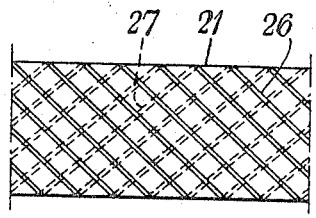
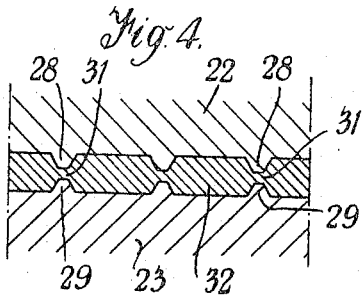
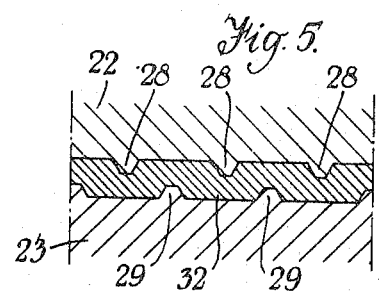
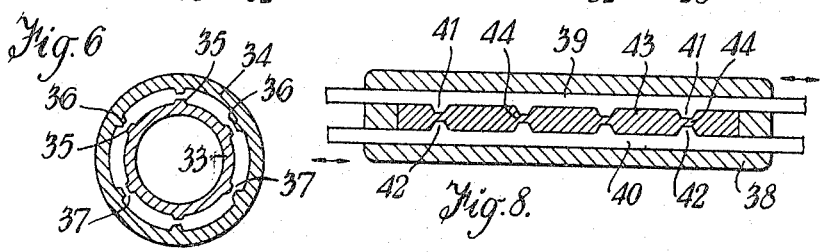
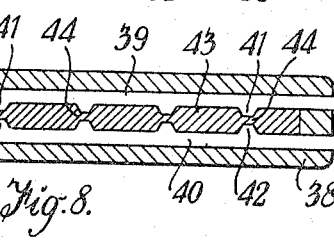
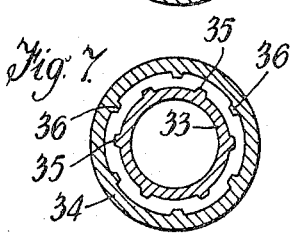
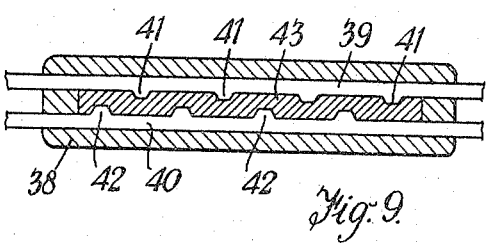

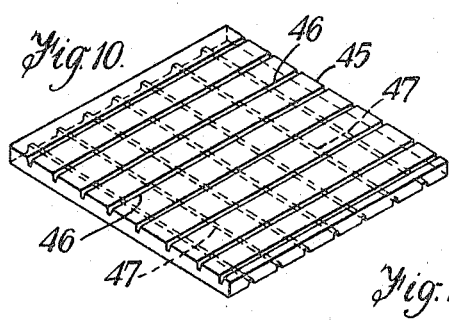
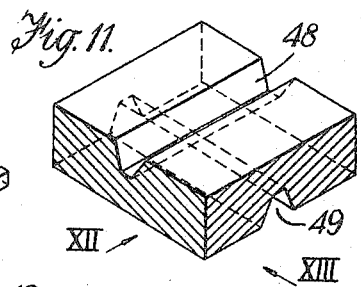
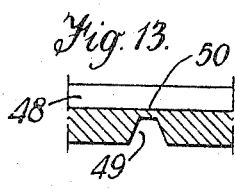
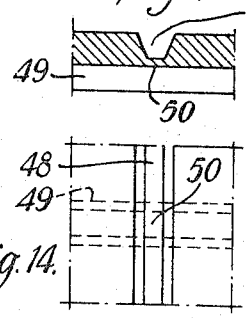
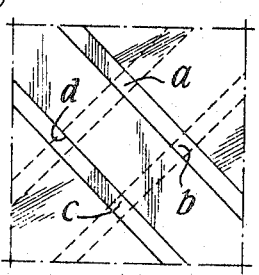
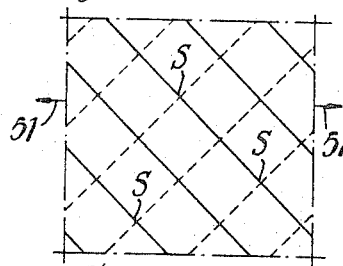
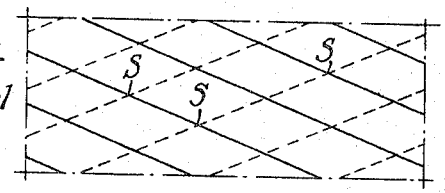
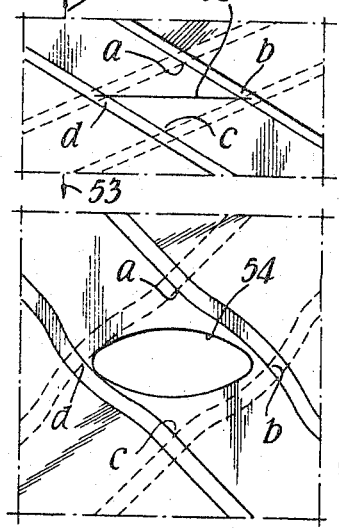
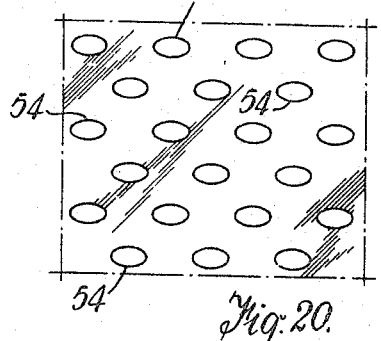

3,488,415
PRODUCTION OF NET-LIKE FABRICS FROM PLASTIC MATERIAL
Albert George Patchell, Welwyn Garden City, and Ronald Lloyd, Sawbridgeworth, England, assignors to T. J. Smith & Nephew Limited, Hull, England, a British company
Filed July 21, 1965, Ser. No. 473,702
Int. Cl. B29c *17/02;* B29d *7/24;* B29g *7/02*
U.S. Cl. 264—154            4 Claims

ABSTRACT OF THE DISCLOSURE

A net-like fabric is produced from plastic material by providing both sides of a continuous sheet of plastic material with grooves which extend partly through the sheet so that the added depth of the grooves in each surface is only a small amount less than the full thickness of the sheet; the grooves on one surface are arranged to cross the grooves on the other surface; the crossing points have only the reduced thickness of the material which separates the bases of the grooves; the sheet thereupon is subjected to a biaxial stretching so that the thinned parts of the sheet at the crossing points of the grooves are given a permanent set so that they split and form perforations at the slits.

---

This invention relates to a method for the production of net-like fabrics from plastic materials, preferably, but not exclusively, those which are capable of being cold drawn, and has for its object to provide such a method having two distinct stages, which is both simple and efficient and capable of producing a variety of patterns for such fabrics.

It has previously been proposed to form plastic net-like fabrics by embossing plastic sheets on one or both surfaces with discreate embossments and then subjecting the embossed sheet to successive stretchings one transverse to the other.

According to the present invention, a sheet of plastic material adapted to be drawn, is formed by casting, extrusion or passing through calendering or other forming rollers, and this sheet is greatly weakened by the simultaneous or other formation of mutually unconnected continuous grooves on both sides, which extend partly through the thickness of the sheet, so that the added depths of the grooves on each side is only a small amount less than the full thickness of the sheet, the grooves on one side of the sheet being disposed to cross the grooves on the other side at a desired angle or angles, so that at the crossing points or zones there is only the reduced thickness of the material which separates the grooves on one side from the grooves on the other side.

The grooved sheet thus formed is subjected to a further stage, which is stretching under biaxial stresses, simultaneously or otherwise, and has the effect of concentrating the stress at the weakest parts of the sheet, which are at the crossing positions of the grooves. As further biaxial stretching takes place, splits can be made to propagate in the highly stressed areas, and strands are formed from the material in the base of the grooves which radiate from each weakest zone, and a more or less uniform net-like fabric is formed having stretched strands connecting the thicker masses which behave as discrete areas of reinforcement and so prevent the splits from propagating further through the sheet.

The plastic sheet with weakening grooves on each side can be in flat sheet form or made tubular. When tubular, it is formed through a two-part annular die having a constant width for an annular flow, and with spaced-apart projections on the inner and outer die parts, which projections extend into such width of annular opening, with means for holding one die part fixed and rotating the other in one direction only, or rotating it alternately for a desired angle first in one direction and then in the other; or for rotating both die parts in opposite directions only, or in opposite directions through a desired angle in one direction and then in the other; or for rotating both die parts in the same direction but one at a greater speed than the other.

In order that the invention may be better understood, it will now be described with reference to the accompanying diagrammatic drawings which are given by way of example only and in which:

FIG. 1 is a diagrammatic elevation of one method of forming the grooves in the sheet, in accordance with a part of the present invention.

FIG. 2 is an end elevation of the two rollers shown in FIG. 1.

FIG. 3 is a plan of a portion of FIG. 1.

FIG. 4 shows to a greatly enlarged scale a fragmentary cross section of the sheet material being grooved on the two surfaces, by rollers such as shown in FIGS. 1 and 2, with the parts in one position.

FIG. 5 shows a similar view to FIG. 4, but with the parts in another position.

FIG. 6 shows a diagrammatic cross-section of a two-part annular extruding nozzle for producing tubular sheet material with the grooves on both surfaces, with the parts in one position, according to a portion of the present invention.

FIG. 7 shows a similar view of FIG. 6 but with the parts in another position.

FIGS. 8 and 9 show two similar views to FIGS. 6 and 7 but of a two-part rectilinear die for grooving sheets in according with part of the present invention.

FIG. 10 shows a diagrammatic perspective view, to an enlarged scale, of a portion of a sheet of the plastic material grooved on both surfaces, in accordance with a part of the present invention.

FIG. 11 shows to a greatly enlarged scale a perspective view of one crossing position of the grooves in a sheet such as shown in FIG. 10.

FIG. 12 is a view in the direction of the arrow XII, FIG. 11.

FIG. 13 is a view in the direction of the arrow XIII, FIG. 11.

FIG. 14 is a plan of FIG. 12.

FIG. 15 is a diagrammatic plan of a portion of a sheet such as shown in FIG. 10, to be subjected to a uniaxial stretching in accordance with the present invention.

FIG. 16 shows to a greatly englarged scale a plan of one of the crossing positions of the sheet shown in FIGS. 10 and 15.

FIG. 17 shows a similar view to FIG. 15 but after a uniaxial stretching.

FIG. 18 is a similar view to FIG. 16 but showing the change in the formation at the crossing points due to the uniaxial stretching.

FIG. 19 is a similar view to FIG. 18, but illustrating an approximation of the change produced by a biaxial stretching with the forces mutually at right angles, and FIG. 20 shows to a smaller scale an approximation of a biaxially stretched sheet having the perforations such as illustrated in FIG. 19.

As a preliminary to the particular description, it should be noted throughout that thicknesses have been exaggerated and relative dimensions varied where necessary for the sake of clearness.

FIGS. 1 to 3 illustrate a method, according to part of the present invention, for forming the crossing-groove-weakened plastic sheet 21 in which a dough or paste of the plastic mixture, which in this and other cases can include colouring matter, fillers, or otherwise, is fed between two rollers 22, 23 which rotate in opposite directions and which are spaced to form the required thickness of sheet 21. In addition, these rollers 22, 23 have projecting ridges, fins or the like 24 and 25 respectively which impress themselves into the dough, paste or the like, to form the weakening grooves 26 on one surface and 27 on the other. In the case shown they are constituted by multi-start helices of approximately V section, at desired spacing, which are both of the same hand, as the rollers rotate in opposite directions. The helices on one roller have the same pitch as the helices on the other, although these could be of different pitch.

In other cases these projections could be circumferential or helical on one roller and parallel to the axis on the other.

The enlarged fragmentary views, FIGS. 4 and 5, show portions of rollers such as 22 and 23 with spaced helical ridges or the like of similar projection, hand and pitch 28 and 29 respectively, which are impressing the plastic material 30 with the intersecting grooves. In FIG. 4 the grooves are in the crossing positions and it will be seen that in these positions there are thin portions 31 of the plastic material, which are only a small fraction of the total full thickness of the plastic sheet 32. FIG. 5 shows the section where the grooves do not cross but are in a mid position between two crossing positions.

FIGS. 6 and 7 show a two-part annular extruding die having a constant width for an annular flow. In these figures, 33 is a ring-like inner die part and 34 a ring-like outer die part, while 35 and 36 are equiangularly-spaced-apart radial projections on the inner and outer die parts 33 and 34 respectively. These projections 35 and 36 extend into the constant width of the annular opening of the die, and means (not shown) are provided for holding one die part fixed and rotating the other in one direction only, or rotating it alternately for a desired angle first in one direction and then in the other; or for rotating both die parts in opposite directions only, or in opposite directions through a desired angle in one direction and then in the other; or for rotating both die parts in the same direction but one at a greater speed than the other.

Although the plastic material is not shown in FIGS. 6 and 7 (for the sake of clearness) it will be appreciated that in FIG. 6 the projections 35 and 36 which cause the grooves in the inner and outer surfaces of the tubular sheet to be extruded, are in the cross-over position of the grooves, to leave only thinned parts of the sheet being produced, in the positions 37 between the facing projections 35 and 36.

FIG. 7 shows the relative position between the die parts 33 and 34 at the mid positions between the crossing positions of the grooves to be produced.

By the variation in movement, the timing of the movements plus the rate of feed of the molten plastic material, and the various angular relationships possible between the grooves on the two sides, as well as the dimensions and spacings of the grooves, it will be appreciated that a variety of patterns can be given to the weakened plastic sheets with the grooves on the two sides.

FIGS. 8 and 9 are views similar to FIGS. 6 and 7 but of a rectilinear die 38. In this case there are two co-operating rectilinear die parts 39 and 40 having facing projections 41 and 42 respectively, and means (not shown) are provided to give these parts relative reciprocating movements to produce the crossing grooves in the sheet 43 being formed. In FIG. 8 the projections are in the cross-over positions of the grooves, to leave the sheet thinned at 44 between the projections, whilst in FIG. 9 the projections are in the mid-way position between the crossing positions of the grooves.

Whatever the actual method for their formation, the grooves may have any desired and suitable section, for example channel-shaped, somewhat semicircular, V-shaped, U-shaped, or otherwise.

For the biaxial stretching of the flat plastic sheet with the grooves on the two sides after it has set, it could either be let off from a supply roll on which it had been wound or, after setting, fed directly to an overdriving device in the leading part of the sheet, so that stretching is effected between gripping, let-off rollers or the like turning at a certain linear speed, and other pulling rollers turning at a higher linear speed. The other simultaneously applied stressing action can then comprise means to prevent the portion of the sheet in the zone undergoing the longitudinal stretching from assuming a narrower width, or it could be by stenter gripping means applying a positive transverse stress in this zone.

Of course, any other means could be adapted for applying the biaxial stretching to the flat sheet grooved on both sides, either simultaneously or one after the other.

One method for the biaxial stretching of the set tubular sheet with the grooves on the interior and exterior, is to pull this by take-up rollers, with or without guide rollers and other guiding means (to constitute the longitudinal stretching) over a mandrel or sleeve of gradually expanding section of the necessary dimensions, to exert the transverse stretching on the material at right angles to the longitudinal stretching. The outer surface of this mandrel or sleeve could be faced with a suitable material such as polytetrafluorethylene for minimising the friction between the relatively moving parts.

Where the two stages of the method according to the present invention are continuous, the expanding mandrel or sleeve could be supported from the outer end of the annular nozzle structure. In this case, however, care must be taken that the material, before passing to the second stage of the method, is adequately cooled and set.

The arrangement of the grooves on the two sides of the sheet of plastic material can be as desired. For example, the grooves on one side can be all inclined at the same angle which crosses the longitudinal length of the material at less than a right angle, and on the other side of the sheet the angular arrangement can be the same but in the opposite direction. This will result in a more or less uniformly arranged diamond pattern to the subsequently formed net.

In other cases the grooves on one surface can be of a zig-zag formation with angular or rounded points at the changes of direction, and these parallel zig-zag grooves on one side can be at desired spacing and reversely arranged to the zig-zag grooves coming on the other side of the sheet. Again, the regular spacing of the grooves on one side of the sheet may differ from the regular spacing of the grooves on the other side of the sheet or, still further, on the same side of the sheet the spacing of the grooves may be irregular in any desired manner and co-operate with regularly or irregularly spaced grooves on the other side of the sheet. In any case, a common characteristic of all the arrangements referred to is that the grooves on each side of the sheet are continuous and mutually unconnected.

FIG. 10 shows a grooved sheet 45 in accordance with part of the present invention, in which parallel grooves 46 on one side cross parallel grooves 47 on the other side at right angles to the first grooves, and in which the grooves are uniformly spaced on both surfaces.

The enlarged views FIGS. 11 to 14 show one crossing point. Here the grooves 48 and 49 are somewhat trapezoidal in section and leave a thin portion 50 of the sheet at the crossing part. What may be regarded as the "area" of this portion 50 is square in shape, as will be seen from FIG. 14.

The dimensions of the parts can be varied, but in one example the sheet has a thickness of 0.008″, the groove a depth of 0.0035″ and a mean width of 0.0035″. The thinned parts therefore have a thickness of approximately 0.001" and the area of a square with a side of approximately 0.002". Further, the grooves, in the example, may be spaced 0.050" apart.

Assuming the diagram FIG. 15 represents a portion of a sheet of material such as indicated in FIG. 10, and more specifically as shown in FIGS. 11 to 14, then S represents the various crossing positions of the grooves. Such a crossing position is shown enlarged in FIG. 16 where a–b–c–d represents the square area of thin material.

If the portion of a sheet (FIG. 15) is uniaxially stretched in the direction of the arrows 51 so that it assumes the approximate shape shown in FIG. 17, then the enlargement as shown in FIG. 16 assumes the approximate shape as shown in FIG. 18 and the square a–b–c–d changes to a diamond form. The material of the sheet from b to d, however, is given a certain degree of permanent set which causes the material in this zone to be drawn into a fibrous condition, causing a slit or an incipient slit extending from b to d (and possibly slightly beyond at each end) represented by the line 52, FIG. 18. If now the material (in FIG. 18) is subjected to a stretch in the direction of the arrows 53, then this slit 52 is opened up, giving a result according to the approximation thereof shown in FIG. 19 which includes a somewhat oval-shaped perforation 54 due to the opening of the slit.

The sheet will have such a perforation at each crossing position of the grooves and will have a perforated appearance approximating to that shown in FIG. 20, with the perforations 54 uniformly spread thereover.

A similar result will take place if the two forces for the biaxial stretching are simultaneously applied.

In most cases preferably the cross-section of the grooves on each side of a sheet in accordance with part of the invention, is the same. It may differ, however, and, again, although the depths of the grooves on the two sides of the sheet may be the same, in some cases the depth on one side may be different from that on the other side, the total depth on the two sides, however, being less than the thickness of the sheet.

The invention is not limited to the precise forms or details herein set forth, as these may be varied to suit particular requirements.

What we claim is:

1. A method of producing net-like fabrics from plastic material, comprising forming in one side of a sheet of said plastic material a first set of mutually unconnected continuous grooves, forming in the other side of said sheet and crosswise of said first set of grooves a second set of mutually unconnected continuous grooves of such a depth as to leave areas of reduced thickness where the grooves of said second set of grooves cross the grooves of said first set of grooves, and subjecting said sheet of plastic material to biaxial stretching of a magnitude to cause said areas of reduced thickness to split and form perforations through the sheet.

2. A method as set forth in claim 1, including the step of making the grooves of each set of grooves rectilinear and uniformly spaced from each other thereby producing a sheet with a uniform pattern of perforations.

3. A method as set forth in claim 1, including forming said first and second sets of grooves simultaneously.

4. A method as set forth in claim 3, including the step of forming said first and second sets of grooves by passing the continuous sheet of plastic material between two rotating rollers, one of which has projecting ridges corresponding to said first set of grooves while the other has projecting ridges corrresponding to said second set of grooves.

References Cited

UNITED STATES PATENTS

| 2,728,941 | 1/1956 | Alles et al. | 264—288 X |
| 3,137,746 | 6/1964 | Seymour et al. | 264—154 |
| 3,387,077 | 6/1968 | Sammons | 264—289 |

ROBERT F. WHITE, Primary Examiner

ALLEN M. SOKALAS, Assistant Examiner

U.S. Cl. X.R.

18—10; 264—284, 289, 294